(12) United States Patent
DeVincentis et al.

(10) Patent No.: US 8,169,152 B2
(45) Date of Patent: *May 1, 2012

(54) PLASMA LAMP WITH FIELD-CONCENTRATING ANTENNA

(75) Inventors: Marc DeVincentis, Palo Alto, CA (US); Richard Gilliard, Morgan Hill, CA (US)

(73) Assignee: Luxim Corporation, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/017,273

(22) Filed: Jan. 31, 2011

(65) Prior Publication Data

US 2011/0181184 A1 Jul. 28, 2011

Related U.S. Application Data

(63) Continuation of application No. 12/755,650, filed on Apr. 7, 2010, now Pat. No. 7,880,402, which is a continuation of application No. 11/619,989, filed on Jan. 4, 2007, now Pat. No. 7,719,195.

(60) Provisional application No. 60/756,087, filed on Jan. 4, 2006.

(51) Int. Cl.
*H05B 41/16* (2006.01)

(52) U.S. Cl. ............... 315/248; 315/39; 313/634

(58) Field of Classification Search .......... 315/39, 315/248; 313/231, 634, 636
See application file for complete search history.

(56) References Cited

U.S. PATENT DOCUMENTS

| | | | |
|---|---|---|---|
| 3,787,705 A | 1/1974 | Bolin et al. | |
| 3,826,950 A | 7/1974 | Hruda et al. | |
| 4,001,631 A | 1/1977 | McNeill et al. | |
| 4,206,387 A | 6/1980 | Kramer et al. | |
| 4,485,332 A | 11/1984 | Ury et al. | |
| 4,498,029 A | 2/1985 | Yoshizawa et al. | |
| 4,633,140 A | 12/1986 | Lynch et al. | |
| RE32,626 E | 3/1988 | Yoshizawa et al. | |
| 4,749,915 A | 6/1988 | Lynch et al. | |
| 4,795,658 A | 1/1989 | Kano et al. | |
| 4,887,192 A | 12/1989 | Simpson et al. | |
| 4,950,059 A | 8/1990 | Roberts | |
| 4,975,625 A | 12/1990 | Lynch et al. | |

(Continued)

FOREIGN PATENT DOCUMENTS

JP 8148127 6/1996

(Continued)

OTHER PUBLICATIONS

"U.S. Appl. No. 11/619,989, Non-Final Office Action mailed May 13, 2009", 17 pgs.

(Continued)

*Primary Examiner* — Tung X Le
(74) *Attorney, Agent, or Firm* — Schwegman, Lundberg & Woessner, P.A.

(57) ABSTRACT

An electrodeless plasma lamp is described comprising a lamp body including a solid dielectric material. The lamp includes a bulb received at least partially within an opening in the solid dielectric material and a radio frequency (RF) feed configured to provide power to the solid dielectric material. A conductive material is provided adjacent to the bulb to concentrate the power proximate the bulb. The conductive material may be located below an upper surface of the solid dielectric material. The conductive material may modify at least a portion of an electric field proximate the bulb so that the portion of the electric field is oriented substantially parallel to an upper surface of the lamp body.

21 Claims, 10 Drawing Sheets

U.S. PATENT DOCUMENTS

| | | | |
|---|---|---|---|
| 4,978,891 A | | 12/1990 | Ury |
| 5,039,903 A | | 8/1991 | Farrall |
| 5,070,277 A | | 12/1991 | Lapatovich |
| 5,072,157 A | | 12/1991 | Greb et al. |
| 5,084,801 A | | 1/1992 | El-Hamamsy et al. |
| 5,086,258 A | | 2/1992 | Mucklejohn et al. |
| 5,113,121 A | * | 5/1992 | Lapatovich et al. .......... 315/248 |
| 5,361,274 A | | 11/1994 | Simpson et al. |
| 5,438,242 A | | 8/1995 | Simpson |
| 5,448,135 A | | 9/1995 | Simpson |
| 5,498,937 A | | 3/1996 | Korber et al. |
| 5,525,865 A | * | 6/1996 | Simpson .......... 315/39 |
| 5,545,953 A | | 8/1996 | Lapatovich et al. |
| 5,594,303 A | | 1/1997 | Simpson et al. |
| 5,786,667 A | | 7/1998 | Simpson et al. |
| 5,841,244 A | | 11/1998 | Hamilton et al. |
| 5,886,479 A | * | 3/1999 | Kennedy et al. .......... 315/248 |
| 5,910,710 A | | 6/1999 | Simpson |
| 5,910,754 A | | 6/1999 | Simpson et al. |
| 5,923,116 A | | 7/1999 | Mercer et al. |
| 6,020,800 A | | 2/2000 | Arakawa et al. |
| 6,031,333 A | | 2/2000 | Simpson |
| 6,049,170 A | | 4/2000 | Hochi et al. |
| 6,137,237 A | * | 10/2000 | MacLennan et al. .......... 315/248 |
| 6,246,160 B1 | | 6/2001 | MacLennan et al. |
| 6,252,346 B1 | | 6/2001 | Turner et al. |
| 6,265,813 B1 | | 7/2001 | Knox et al. |
| 6,291,936 B1 | | 9/2001 | MacLennan et al. |
| 6,313,587 B1 | | 11/2001 | MacLennan et al. |
| 6,326,739 B1 | | 12/2001 | MacLennan et al. |
| 6,424,099 B1 | * | 7/2002 | Kirkpatrick et al. .......... 315/248 |
| 6,518,703 B1 | | 2/2003 | Hochi et al. |
| 6,566,817 B2 | | 5/2003 | Lapatovich |
| 6,617,806 B2 | * | 9/2003 | Kirkpatrick et al. .......... 315/248 |
| 6,621,195 B2 | | 9/2003 | Fuji et al. |
| 6,666,739 B2 | | 12/2003 | Pothoven et al. |
| 6,737,809 B2 | | 5/2004 | Espiau et al. |
| 6,856,092 B2 | | 2/2005 | Pothoven et al. |
| 6,922,021 B2 | | 7/2005 | Espiau et al. |
| 7,012,489 B2 | | 3/2006 | Sherrer et al. |
| 7,034,464 B1 | * | 4/2006 | Izadian et al. .......... 315/39 |
| 7,291,985 B2 | | 11/2007 | Espiau et al. |
| 7,348,732 B2 | | 3/2008 | Espiau et al. |
| 7,358,678 B2 | | 4/2008 | Espiau et al. |
| 7,362,054 B2 | | 4/2008 | Espiau et al. |
| 7,362,055 B2 | | 4/2008 | Espiau et al. |
| 7,362,056 B2 | | 4/2008 | Espiau et al. |
| 7,372,209 B2 | | 5/2008 | Espiau et al. |
| 7,391,158 B2 | | 6/2008 | Espiau et al. |
| 7,429,818 B2 | | 9/2008 | Chang et al. |
| 7,719,195 B2 | | 5/2010 | Devincentis et al. |
| 7,880,402 B2 | | 2/2011 | DeVincentis et al. |
| 2001/0035720 A1 | | 11/2001 | Guthrie et al. |
| 2002/0105274 A1 | | 8/2002 | Pothoven et al. |
| 2002/0180356 A1 | | 12/2002 | Kirkpatrick et al. |
| 2003/0193299 A1 | | 10/2003 | Choi et al. |
| 2005/0212456 A1 | | 9/2005 | Espiau et al. |
| 2005/0286263 A1 | | 12/2005 | Champion et al. |
| 2006/0250090 A9 | | 11/2006 | Guthrie et al. |
| 2007/0109069 A1 | | 5/2007 | Espiau et al. |
| 2007/0171006 A1 | | 7/2007 | DeVincentis |
| 2007/0211991 A1 | | 9/2007 | Espiau et al. |
| 2007/0217732 A1 | | 9/2007 | Chang et al. |
| 2007/0236127 A1 | | 10/2007 | DeVincentis et al. |
| 2008/0054813 A1 | | 3/2008 | Espiau et al. |
| 2008/0203922 A1 | | 8/2008 | Guthrie et al. |
| 2008/0211971 A1 | | 9/2008 | Pradhan |
| 2010/0315000 A1 | | 12/2010 | Devincentis et al. |

FOREIGN PATENT DOCUMENTS

| | | |
|---|---|---|
| KR | 1020050018587 A | 2/2005 |
| WO | WO-2006070190 A1 | 7/2006 |
| WO | WO-2006129102 A2 | 12/2006 |
| WO | WO-2007079496 A2 | 7/2007 |
| WO | WO-2007079496 A3 | 7/2007 |
| WO | WO-2007138276 A2 | 12/2007 |

OTHER PUBLICATIONS

"U.S. Appl. No. 11/619,989, Non-Final Office Action mailed Aug. 21, 2009", 14 pgs.

"U.S. Appl. No. 11/619,989, Notice of Allowance mailed Feb. 26, 2010", 7 pgs.

"U.S. Appl. No. 11/619,989, Response filed May 27, 2009 to Non Final Office Action mailed May 13, 2009", 13 pgs.

"U.S. Appl. No. 11/619,989, Response filed Dec. 18, 2009 to Non Final Office Action mailed Aug. 21, 2009", 16 pgs.

"U.S. Appl. No. 12/755,650, Notice of Allowance mailed Dec. 15, 2010", 8 pgs.

"U.S. Appl. No. 12/755,650, Preliminary Amendment mailed Aug. 26, 2010", 7 pgs.

"Chapter 4—Cavity Resonators, Army Technical Manual, TM 11-673—Generation and Transmission of Microwave Energy", (Jun. 1953), 12 pgs.

"Chapter 6.3—Rectangular Waveguide Cavities", in: Microwave Engineering, Pozar, D. M., Editor (John Wiley & Sons, Inc.), (Jul. 1997), pp. 313-318.

"International Application Serial No. PCT/US2007/060110, International Preliminary Examination Report mailed Jul. 17, 2008", 7 pgs.

"International Application Serial No. PCT/US2007/060110, Search Report mailed Feb. 25, 2008", 3 pgs.

"International Application Serial No. PCT/US2007/060110, Written Opinion mailed Feb. 25, 2008", 5 pgs.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp Is Built Into the Wave-Guide Structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", Guthrie Exhibit 2173, Board of Patent Appeals and Interferences (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, 16 pgs.

Guthrie, Charles, "Lamp", U.S. Appl. No. 60/687,458, filed Jun. 6, 2005, 12 pgs.

Guthrie, Charles, et al., "Lamp", U.S. Appl. No. 60/687,280, filed Jun. 3, 2005, 17 pgs.

Inventors Not Listed, "Lamp", International Application Serial No. PCT_GB2007_001935, International filing date May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", In: Microwave Engineering, 3rd Edition, 2005 (John Wiley & Sons, Inc.), (2005), 9 pgs.

Pozar, D. M., "Section 6.4, Circular Waveguide Cavities", in: Microwave Engineering, 3rd Edition, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That Is Integrated Into a Waveguide", U.S. Appl. No. 60/262,536, filed Jan. 17, 2001, 6 pgs.

Sandberg, E., "An Improved Drive Circuit for an Electrode-Less Plasma Lamp That is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", In: Lamps & Lighting, 4th Edition, 1997 (Arnold & John Wiley & Sons, Inc., (1997), 13 pgs.

Wharmby, D. O., "Electrodeless Lamps for Lighting: A Review", IEEE Proceedings-A, vol. 140 (6), (Nov. 1993), 9 pgs.

Wilson, D., et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That is Integrated Into a Wave-Guide", U.S. Appl. No. 60/224,289, filed Aug. 10, 2000, 6 pgs.

Wilson, D., et al., "Means to Reduce EMI in a Wave-Guide", U.S. Appl. No. 60/224,503, filed Aug. 10, 2000, 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

"European Application Serial No. 07717707.9, Extended European Search Report mailed May 23, 2011", 6 pgs.

"European Application Serial No. 07717707.9, Response filed Dec. 15, 2011 to Extended Search Report mailed", 4 pgs.

* cited by examiner

PLASMA LAMP WITH FIELD-CONCENTRATING ANTENNA

CROSS-REFERENCE TO RELATED APPLICATIONS

This application is a continuation of and claims the benefit of priority under 35 U.S.C. §120 to U.S. patent application Ser. No. 12/755,650, filed on Apr. 7, 2010, and issued as U.S. Pat. No. 7,880,402 on Feb. 1, 2011, which is a continuation of and claims the benefit of priority under 35 U.S.C. §120 to U.S. patent application Ser. No. 11/619,989, filed on Jan. 4, 2007, and issued as U.S. Pat. No. 7,719,195 on May 18, 2010, which claims benefit of priority under 35 U.S.C. §119(e) to U.S. Provisional Application No. 60/756,087, filed on Jan. 4, 2006, which applications are incorporated by reference herein in their entirety.

FIELD

The field of the present invention relates to devices and methods for generating light, and more particularly to electrodeless plasma lamps.

BACKGROUND

Electrodeless lamps may be used to provide point-like, bright, white light sources. Because electrodes are not used, they may have longer useful lifetimes than other lamps. Some plasma lamps direct microwave energy into an air cavity, with the air cavity enclosing a bulb containing a mixture of substances that can ignite, form a plasma, and emit light. However, for many applications, light sources that are brighter, smaller, less expensive, more reliable, and have longer lifetimes are desired.

Plasma lamps have been proposed that use a dielectric waveguide body to reduce the size of the lamp. An amplifier circuit may be used to provide power to the waveguide body to excite a plasma in a bulb positioned within a lamp chamber in the waveguide body.

What is desired are lamps with improved brightness and efficiency which can serve as a light source in products such as large-screen television sets and digital light processing projection systems. What is also desired are improved methods for production of plasma lamps, including manufacture of key components and overall lamp assembly.

INCORPORATION BY REFERENCE

All publications and patent applications mentioned in this specification are herein incorporated by reference to the same extent as if each individual publication or patent was specifically and individually indicated to be incorporated by reference.

BRIEF DESCRIPTION OF THE DRAWINGS

The novel features of the invention are set forth with particularity in the appended claims. A better understanding of the present invention will be obtained by reference to the following detailed description that sets forth illustrative embodiments, in which the principles of the invention are utilized, and the accompanying drawings of which:

DETAILED DESCRIPTION

Figure 1:
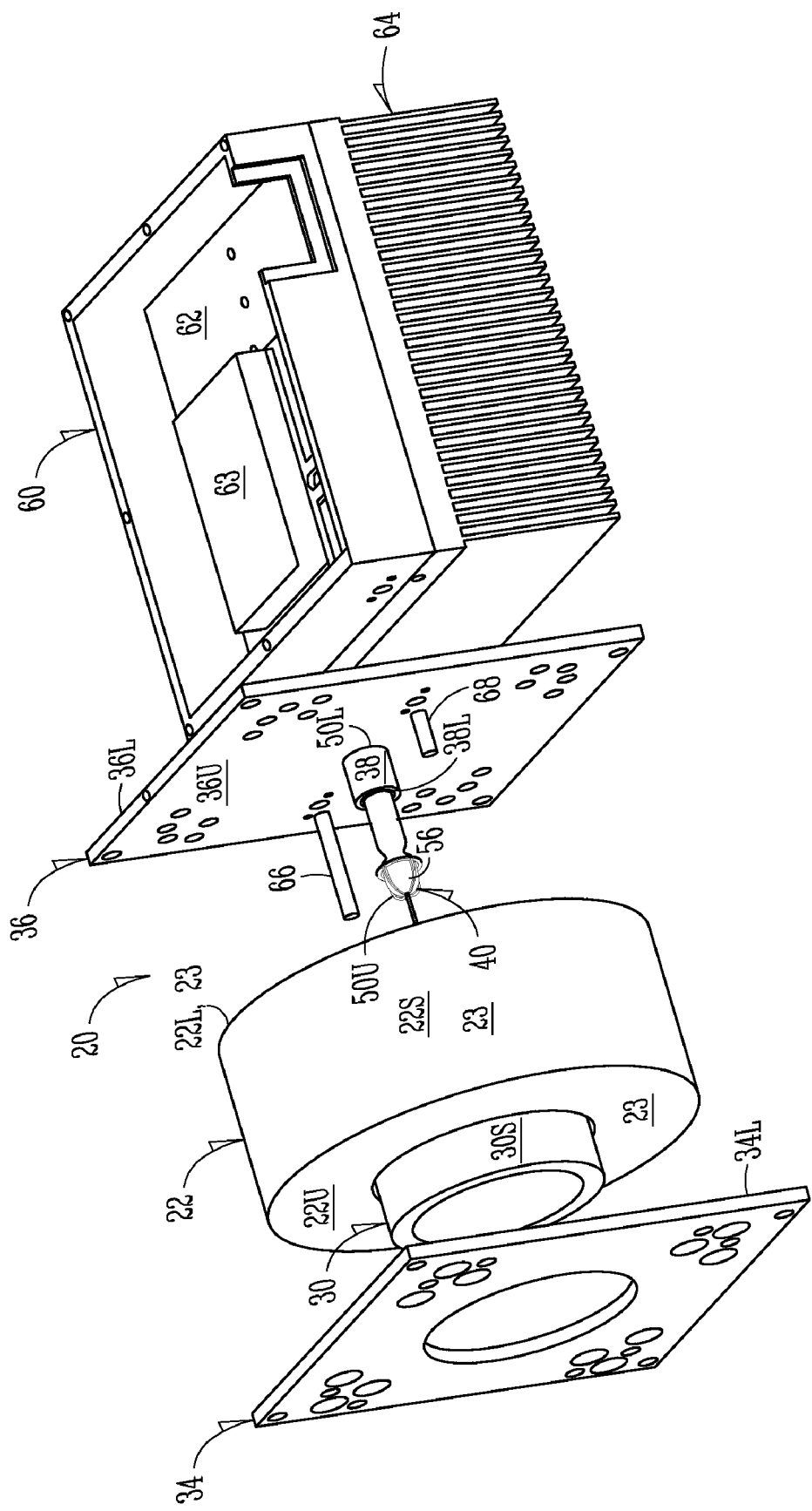
FIG. 1 shows a partially exploded perspective view of a plasma lamp according to an example embodiment including a cylindrical dielectric waveguide body, a dielectric sleeve insert forming a lamp chamber with a light-reflecting paraboloidal surface, a bulb assembly with a tipless bulb, and a field-concentrating antenna.

While the present invention is open to various modifications and alternative constructions, the embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as described herein and as expressed in the appended claims.

Figure 11:
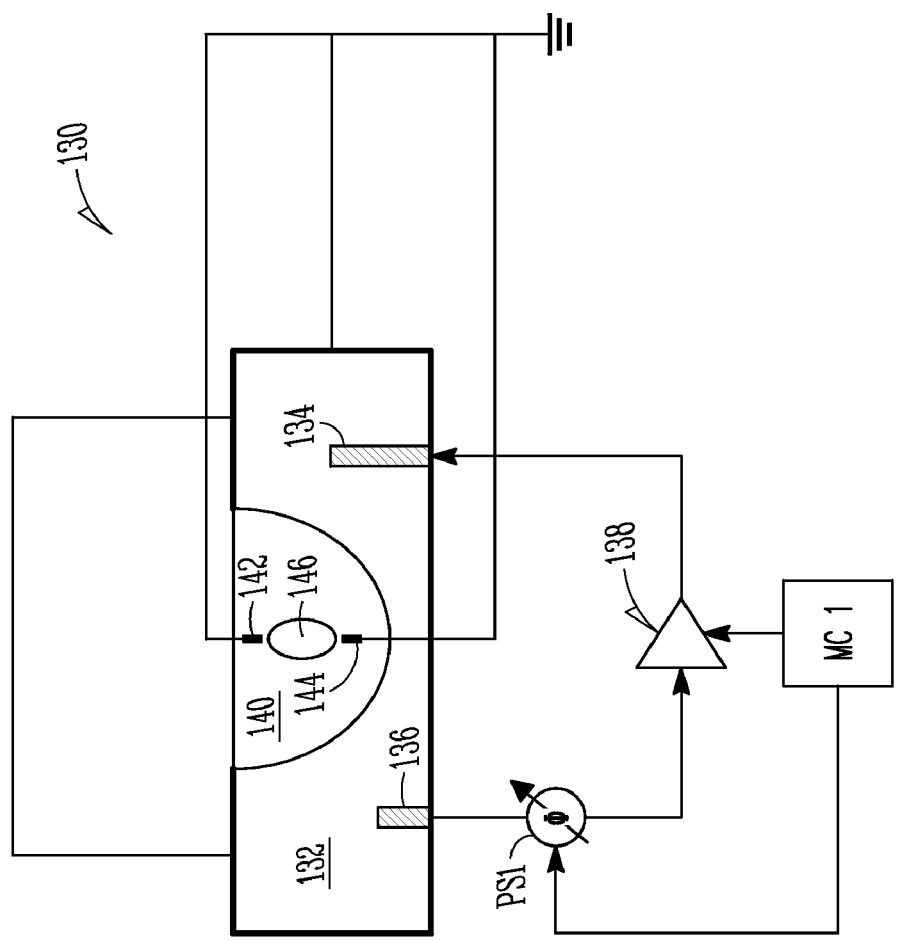
FIG. 11 schematically shows an electric circuit for a plasma lamp having a FIG. 10 bulb assembly.

As shown in FIG. 11, an example embodiment provides a plasma lamp with a waveguide body 132 comprising a dielectric material. In the example embodiment of FIG. 11, the waveguide body is configured to resonate when power is provided to the waveguide body at a particular frequency. By operating at or near a resonant frequency, power builds in the waveguide body and can be used to ignite and sustain a plasma discharge in a bulb 146 adjacent to the waveguide body 132. Electromagnetically, the waveguide body acts as a resonant cavity in this example. In example embodiments, the waveguide body may be configured to resonate in a fundamental mode, a second order mode, third order mode or other resonant mode.

The size of the waveguide body required to achieve resonance at a desired frequency generally scales inversely with the square root of the dielectric constant of the material used. As a result, materials with a higher dielectric constant may be used to reduce the size of the lamp. In an example embodiment, the waveguide body 132 has a dielectric constant greater than 1, which is the dielectric constant of air. For example, alumina, a ceramic having a dielectric constant of about 9, may be used. In some embodiments, the dielectric material may have a dielectric constant in the range of from 2 to 10 or any range subsumed therein, or a dielectric constant in the range from 2 to 20 or any range subsumed therein, or a dielectric constant in the range from 2 to 100 or any range subsumed therein, or an even higher dielectric constant. In some embodiments, the waveguide body may include more than one such dielectric material resulting in an effective dielectric constant for the body within any of the ranges described above.

In this example embodiment, the waveguide body forms a lamp chamber 140 with a tapered wall that reflects light out of the lamp chamber. In some embodiments, the wall may taper to a vertex and form a shape having a focal point in the lamp chamber. For example, the lamp chamber 140 may have a paraboloidal or ellipsoidal shape. The walls of the lamp chamber may comprise a reflective dielectric materials (such as alumina) and/or be coated with a reflective coating such as a thin film, multi-layer dielectric coating. In this example, the reflective surface is not made from a conductive material that would prevent or substantially attenuate the transmission of power from the waveguide body 132 into the lamp chamber 140. In one example embodiment, a thin film, multi-layer dielectric coating of multiple layers of silicon dioxide (SiO2) may be used. Another example embodiment uses layers of titanium dioxide (TiO2). Typically, coatings used in the present invention have approximately 10 to 100 layers with each layer having a thickness in a range between 0.1 micron and 10 microns or any range subsumed therein.

In example embodiments, a bulb 146 is positioned completely or partially in the lamp chamber. The bulb contains a fill that forms a plasma and emits light when power is provided from the waveguide body to the bulb. The light is reflected from the walls of the lamp chamber 140 out the front of the lamp. The position of the bulb and the shape of the lamp chamber may be selected to provide a desired ray divergence out the front of the lamp. In example embodiments, the bulb may be positioned above the vertex of the lamp chamber such that the arc formed in the bulb is near the focal point of the lamp chamber. In example embodiments, the rays exiting the lamp chamber may be convergent, parallel or have some other ray divergence that matches an optical system used with the lamp. For instance, an optical system with lenses, reflectors and/or light pipes may be used in a projection display system to provide light from the light source to a spatial light modulator (SLM). In an example embodiment, the position of the bulb and the shape of the lamp chamber may match the ray divergence required by the optical system used with the lamp (e.g., the optical system for a projection display). The surface shape may be optimized for the desired ray divergence using commercial ray-tracing software, taking into account the finite emission volume of the plasma in the bulb, geometric constraints imposed by the bulb support structure, and constraints imposed by manufacturing processes. Suitable software products include ZEMAX™, available from Zemax Development Corporation of San Diego, Calif., and CODE-V™, available from Optical Research Associates of Pasadena, Calif. In example embodiments, the lamp chamber may provide a reflective surface that approximates a paraboloidal or ellipsoidal shape and the center of the bulb may be positioned at or near a focal point for the particular shape. In example embodiments, the arc length of the plasma is relatively small and the arc may be centered at or near the focal point of the reflective lamp chamber.

In the example shown in FIG. 11, the bulb 146 may be positioned completely inside the lamp chamber 140 and may be at or near a focal point of the lamp chamber. In some alternative embodiments, a portion of the bulb could be in contact with the walls of the waveguide body or another material to act as a heatsink. Also, in alternative embodiments, the end of the bulb could extend outside of the lamp chamber to isolate it from the region of highest plasma intensity. However, the example embodiment in FIG. 11 uses a bulb positioned completely in the lamp chamber and spaced from the reflective walls of the waveguide in order to provide high brightness and desired reflection/ray divergence. In example embodiments, the power is provided along the entire length of the bulb, so the arc length of the bulb is determined primarily by the size of the bulb. The bulb has a relatively short inner length and small volume to provide a small arc length and high power density. In example embodiments, the arc length may be in the range of from 2 mm to 10 mm or any range subsumed therein. The bulb also has relatively thick walls to withstand exposure to the plasma environment. In an example embodiment, the top and bottom of the bulb have a hemisphere shape with a central cylindrical section connecting the two ends. In a particular example, the bulb may have an inner width of about 3 mm, an inner length of about 5 mm, a volume of about 23.55 mm$^3$ and a wall width of about 3.5 mm.

Other bulb configurations may be used in other embodiments. For example, the bulb may be cylindrical with a planar top and bottom or hemisphere top and bottom; or the bulb may be spherical; or the bulb may have an oval cross section with curved top and bottom surfaces. These shapes are examples only and other shapes may be used as well such as parabolically contoured bulbs or irregularly shaped bulbs (e.g., hourglass shaped bulbs).

Each of the above bulbs has a length L between the inside walls of the bulb and an outer length OL. Each of the bulbs also has a width W between the inside walls of the bulb and an outer width OW. In bulbs with circular cross sections, the width W is equal to the inner diameter of the bulb and the outer width OW is equal to the outer diameter of the bulb. In a spherical bulb, the length and width are both equal to the diameter. For irregular shaped bulbs, the inner width may be determined by using the largest interior width in the region where power is predominantly coupled into the bulb and the inner length may be determined using the greatest length between distal ends of the bulb.

In example embodiments, the bulb may be in any of the above shapes or other shapes and have, for example, an outer width OW in a range between 2 and 35 mm or any range subsumed therein, an inner width W in a range between 1 and 25 mm or any range subsumed therein, a wall thickness in a range between 0.5 and 5 mm or any range subsumed therein, an inner length L between 3 and 20 mm or any range subsumed therein. In example embodiments, the bulb volume may be between 10.47 mm$^3$ and 750 mm$^3$ or any range subsumed therein. The above dimensions are examples only and bulbs with other dimensions may also be used in embodiments of the present invention.

Example bulbs in any of the above configurations may comprise an envelope of transmissive material such as quartz, sapphire or other solid dielectric. In some embodiments, the bulb envelope may be formed from a monolithic material. In other embodiments, bulbs may also be formed by a combination of materials forming an envelope. For example, a reflective body of ceramic may have an opening covered by a transmissive window of quartz, sapphire or other transmissive material. Some bulbs may also be formed in part by surfaces of the waveguide body and/or other surfaces of a lamp body. For example, a lamp chamber may be formed in the waveguide body and covered by a transmissive window of quartz, sapphire or transmissive material.

Some bulbs may be filled through a small opening that is then sealed. This can form a surface irregularity, called a "tip" or "tubulation", where the bulb is sealed. In particular, some bulbs may be filled through a side wall of the bulb and an irregular side tubulation may be formed. With high temperatures and high pressures in an electrodeless bulb, a side tubulation that is too thin may be susceptible to failure and a side tubulation that is too thick may introduce optical distortions. Non-uniformities may also cause localized hot spots that can cause failure. For example, the pressure inside an electrodeless plasma bulb may be in the range of from 50 atmospheres to 250 atmospheres or more, or any range subsumed therein, and the temperature may be greater than 800 degrees Celsius.

In example embodiments, the bulb may be fabricated from a tube of dielectric material such as quartz using a tipless method that does not form side tubulation irregularities. The tube is sealed at one end and a fill is provided through the other end of the tube. The other end of the tube is then closed with a torch at a point about one inch longer than the desired inner length. A bulb of this type can be fabricated with a relatively thick, uniform wall to withstand the plasma environment and a relatively small interior volume to confine the plasma arc. Since the surface irregularities of a tip are avoided, more uniform heat dissipation and more uniform optical surface for light collection may be achieved. In example embodiments, this process may be used to form a relatively thick bulb wall that has a substantially uniform thickness. For example, the wall thickness may be in the range of about 2.5 mm to 5 mm or any range subsumed therein and the uniformity of the wall thickness may be within ±5-20% of the wall thickness or any range subsumed therein. In some example embodiments, the uniformity of the wall thickness may be within ±0.25 mm.

The bulb may be positioned in the lamp chamber using a pedestal or other support. In one example embodiment, a tipless bulb is used and tubing below the bulb is retained to act as a support for the bulb. The support may be attached to the wall of the lamp chamber or may pass through a hole in the waveguide body and be attached to a separate support. The bulb may be positioned in the lamp chamber spaced apart from the wall of the lamp chamber and below the opening at the top of the lamp chamber. As described above, the bulb may be at or near a focal point for the lamp chamber. In some embodiments, the distance from the interior of the bulb to the bottom of the lamp chamber may range from about half the inner length of the bulb to twice the inner length of the bulb or more. In some example embodiments, this distance may range from 2 mm to 25 mm or more, or any range subsumed therein. In some embodiments, the closest distance from the interior of the bulb to the walls of the lamp chamber may also be from 2 mm to 25 mm or more, or any range subsumed therein. In some embodiments, the distance from the interior of the bulb to the top of the lamp chamber may range from about half the inner length of the bulb to three times the inner length of the bulb or more. In some example embodiments, this distance may range from 2 mm to 40 mm or more, or any range subsumed therein. In some embodiments, the focal point and position of the bulb arc is closer to the bottom vertex of the lamp chamber than to the top opening. The above dimensions are examples only and bulb configurations with other dimensions may also be used in embodiments of the present invention.

A power source, such as amplifier 138, may be coupled to the waveguide body to provide power at a frequency in the range of 50 MHz to 30 GHz or any range subsumed therein. The amplifier 138 may be coupled to a drive probe 134 to provide power to the waveguide body. The drive probe may be inserted into an opening formed in the waveguide body and may be in direct contact with the waveguide body to effectively couple power into the waveguide body. A feedback probe 136 may be coupled to the waveguide body and the amplifier to obtain feedback from the waveguide body and provide it to the amplifier. The feedback probe may be inserted into an opening formed in the waveguide body and may be in direct contact with the waveguide body to effectively obtain feedback from the waveguide body.

The outer surfaces of the waveguide body 132 may be coated with a conductive material. In example embodiments, the coating may be metallic electroplating. In other embodiments, the coating may be silver paint or other metallic paint. The paint may be brushed or sprayed onto the waveguide body and may be fired or cured at high temperature. In an example embodiment, the holes where the probes are inserted are not coated with the conductive coating in order to allow power to be effectively coupled into the waveguide body and similarly the walls of the lamp chamber are not coated to allow power to be coupled from the waveguide body into the lamp chamber 140. Since the lamp chamber 140 may be substantially larger than the bulb 146 in order to provide the desired reflective properties, some embodiments may use conductive material adjacent to the bulb to concentrate radio frequency power near the bulb. As shown at 142 and 144 in FIG. 11, a conductive material may be external to the interior of the bulb, but may extend very close to the interior of the bulb. For example, the material may be about 1 mm from the interior of the bulb. In other example embodiments, this distance may range from 0.1 mm to 5 mm or any range subsumed therein. In some embodiments, this distance may be less than the thickness of the bulb wall and the conductive material may extend into the bulb wall. The conductive material acts as an antenna that concentrates power near the bulb. To avoid arcing and oxidation, the conductive material may be enclosed in a dielectric material such as quartz. In this example, the conductive material may be hermetically sealed in a dielectric material, at least in the region adjacent to the bulb where the power densities are the highest. In one example embodiment, the conductive material is a thin foil of molybdenum or other conductive material. For example, the foil may have a thickness of about 100 microns or less. In some embodiments, the foil may have a thickness of about 20 microns or less. A very thin conductive material such as molybdenum foil may be advantageous, because it can be sealed in a dielectric material such as quartz or even penetrate the bulb wall without causing damage due to thermal expansion of the conductive material inside the dielectric material. The conductive coating on the outer surface of the waveguide body 132 and the conductive antennas 142 and 144 are grounded. In example embodiments, a common ground may be provided for these elements.

In the example embodiment of FIG. 11, the waveguide body is configured to resonate when power is provided by the amplifier 138 to the drive probe at a particular frequency. However, the ignition of the plasma in the bulb and heating of the bulb and the waveguide body may cause resonant conditions to change (for example, due to changes in the load characteristics and thermal expansion of the bulb and waveguide body). The feedback adjusts to changing lamp conditions to sustain oscillation. A phase-shifter PS1 may be used to adjust the phase of the signal as lamp conditions change to reduce reflection of power from the waveguide body 132 and maintain efficient coupling of power. The phase may also be adjusted during the ignition process to over couple power to the waveguide body for a short period of time in order to spike the power to expedite initial ignition of the plasma in the bulb. The phase-shifter may be controlled by a microcontroller MC1 or other control circuit during the startup process and steady state operation to achieve desired operating characteristics.

Figure 3:
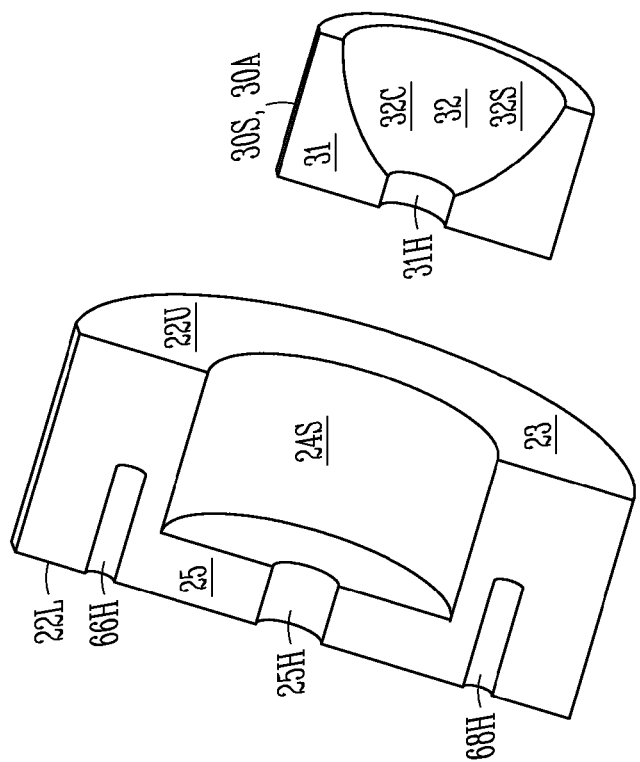
FIG. 3 is a sectional view of the FIG. 2 waveguide body and sleeve, taken along line 3-3.
Figure 2:
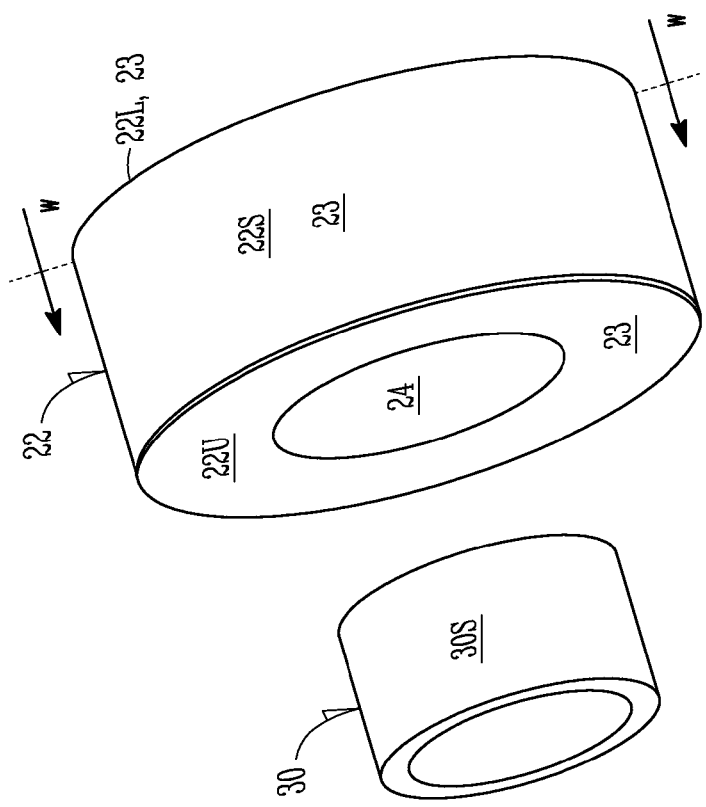
FIG. 2 is an exploded perspective view of the FIG. 1 waveguide body and sleeve.

Additional details regarding example embodiments will now be described with reference to FIGS. 1-10. Referring to FIGS. 1, 2 and 3, a plasma lamp 20 according to an example embodiment includes a cylindrically-shaped dielectric waveguide body 22 having a generally circular outer surface 22S coated with electrically conductive material 23, a bore 24 determined by a generally circular surface 24S, and opposed generally parallel upper and lower surfaces 22U, 22L coated with electrically conductive material 23. A cylindrical dielectric sleeve 30 having an outer surface 30S and a paraboloidal lamp chamber 32 determined by a surface 32S is closely received within bore 24. The dielectric sleeve 30 forms the desired reflective lamp chamber 32, but is fabricated as a separate insert that can fit into the bore 24 in waveguide body 22 for ease of manufacture. While FIGS. 1, 2 and 3 illustrate how the dielectric sleeve 30 would be inserted into the bore 24, the top of the dielectric sleeve 30 would be aligned with the top of the waveguide body 22 when fully assembled in this example embodiment. Waveguide body 22 and sleeve 30 can be made of any low-loss, high dielectric constant material, although alumina is used in a particular example embodiment.

Plasma lamp 20 further includes a metallic top adapter plate 34 having a lower surface 34L to which is electrically grounded an electromagnetic field-concentrating antenna 40, and a metallic bottom adapter plate 36 having upper and lower surfaces 36U, 36L. A generally cylindrical, metallic holder 38 having a lip 38L is attached to surface 36U. A bulb assembly 50 having upper and lower ends 50U, 50L is positioned symmetrically along the common longitudinal axis of waveguide body 22 and lamp chamber 32. As described above, the bulb assembly may be formed from a tube of dielectric material sealed near one end to form a bulb 56 within the bulb assembly. The other end may comprise a length of tube that supports the bulb assembly. The tube is inserted through holes 25H and 31H to position the bulb in the lamp chamber 32. Antenna 40 is proximate to but does not touch bulb assembly upper end 50U. Bulb assembly end 50L is closely received within and bonded to holder 38. Surface 36L is attached to a housing 60 including a circuit board 62 including a microwave amplifier 63 and associated circuitry, and a heatsink-radiator 64. Adapter plates 34 and 36 are bolted to housing 60. Coaxial feeds leading to drive probe 66 and feedback probe 68 extend through circuit board 62 and are received within holes 66H, 68H, respectively, in surface 22L of waveguide body 22. The adapter plate holds the bulb assembly 50 in position relative to the through holes for the probes and acts as a convenient mechanism for aligning the bulb assembly and probes with the waveguide body 22 and dielectric sleeve 30. Thus, plasma lamp 20 is a single unit integrating the waveguide body 22, lamp chamber 32, antenna 40, bulb assembly 50, circuit board 62, and heatsink-radiator 64.

Still referring to FIG. 3, waveguide body 22 has a lower solid portion 25 with a central hole 25H, and sleeve 30 has a lower solid portion 31 with a central hole 31H aligned with hole 25H. Bulb assembly 50 is closely received through holes 25H and 31H. The outer surface 30S of sleeve 30 is coated with an alumina adhesive 30A which bonds to the bore surface 24S. Chamber surface 32S is coated with a plurality of multi-layer dielectric coatings 32C designed to reflect the visible spectrum, as described above. Although chamber 32 is shown to have the shape of a parabola rotated about the longitudinal axis, its shape can be any one of a number of similarly rotated conic curves, a plurality of discretely-faceted surfaces, or surfaces of arbitrary shape as optimized by optical ray-tracing analysis.

Figure 4:
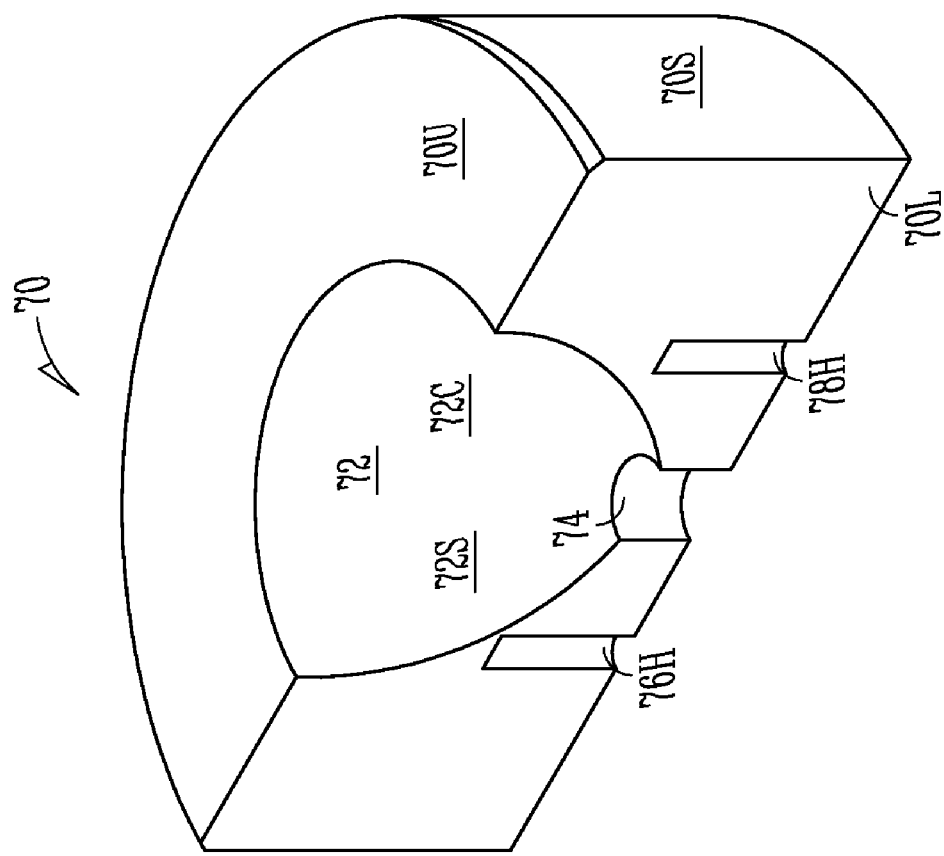
FIG. 4 is a sectional view of a one-piece cylindrical dielectric waveguide body having a lamp chamber with a light-reflecting paraboloidal surface.

Alternatively, a one-piece waveguide body and lamp chamber can be used. FIG. 4 shows a cylindrical, dielectric waveguide body 70 bounded by an outer surface 70S and lower and upper surfaces 70L, 70U. Body 70 includes a lamp chamber 72 determined by a paraboloidal surface 72S coated with a plurality of dielectric coatings 72C. The bottom of chamber 72 is in communication with a hole 74 sized to closely receive a bulb assembly. Holes 76H, 78H are sized to closely receive, respectively, a drive probe and feedback probe.

A plasma bulb must operate at elevated wall temperatures (>800° C.) and internal pressures (between 50 and 250 atmospheres). Fabrication methods which use a separate fill-tube ("tip") to introduce light-emitting material into a bulb made from tubing stock, may result in a very thin closure where the fill-tube was attached to the tubing, typically 1-1.5 mm in thickness, or other surface irregularities. A bulb with such a "thin spot" may have reliability problems at such high temperatures and pressures and could potentially rupture. Also, using a tip may leave an optical blemish on the bulb surface which decreases light throughput. Also, thermal asymmetries may develop which can affect consistent evaporation of halides (and therefore consistent color and lumens as well as consistent warm-up time to full brightness) from bulb to bulb.

In some example lamps, the waveguide body may be narrowed in the region adjacent to the bulb to limit the length of the plasma region. In the example embodiments shown in FIGS. 1-4, the bulb is positioned in the lamp chamber spaced apart from the walls to provide desired reflection and ray divergence. In these example embodiments, the entire internal volume of the bulb is exposed to power coupled into the lamp chamber from the waveguide body. As a result, the length and diameter of the plasma region in the bulb is limited by the dimensions of the bulb and not the shape of the waveguide body adjacent to the bulb. In order to provide a short arc, it is desirable to make the interior bulb volume very short and narrow in the example embodiments of FIGS. 1-4. In one example embodiment, the internal length of the bulb may be about 5 mm and the internal width may be about 3 mm.

In some example lamps, the waveguide body may also provide a heatsink to avoid excessive bulb temperatures. In the example embodiments shown in FIGS. 1-4, the bulb is spaced apart from the walls. Without a heatsink in contact with the bulb, the bulb must survive considerably higher power loadings per unit surface area (i.e., considerably higher bulb temperatures). In order to achieve this in the example embodiments of FIGS. 1-4, the wall of the bulb is made relatively thick with as uniform a wall thickness as practical. A thick-wall bulb will distribute heat far more uniformly than will a thin-wall bulb, or one with wall thickness irregularities. These properties may be achieved by forming a tipless bulb from a tube of dielectric material, such as quartz, in example embodiments. An additional benefit to fabricating a tipless bulb from a tube is a convenient mounting stem formed from the same piece of tubing stock, which can be easily tailored to the desired length to support the bulb in the lamp chamber.

Figure 5:
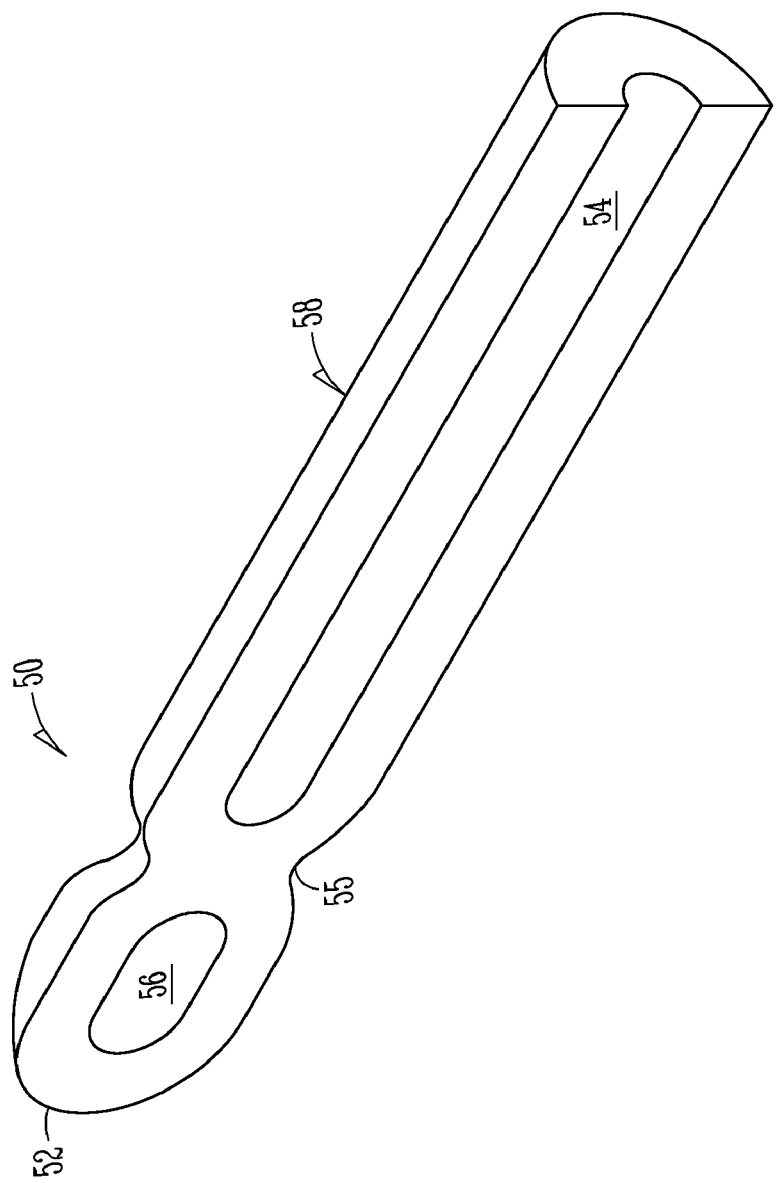
FIG. 5 is a sectional view of the FIG. 1 bulb assembly according to an example embodiment.

An example bulb 56, shown in FIG. 5, is fabricated from tubing stock, such as quartz, without the need for a separate tip. An example method of fabricating a plasma bulb such as bulb 56 is as follows:

A tube, typically cut from a piece of longer stock, is selected having an outer diameter and wall thickness about the same as those of the desired bulb, and a length that depends on the desired length of the bulb assembly. In one example, the outer diameter is about 7 mm and the wall thickness is about 2 mm.

The tube is cleansed and rinsed.

Using a hydrogen-oxygen torch, one end of the tube is rounded and smoothed on a glass-lathe to form an approximately hemispherical closure (52, FIG. 5) with an inner radius about the same as the tube inner radius, and a wall thickness about the same as the tube wall thickness. In other embodiments, other heat sources or mechanisms may be used to close the end of the tube.

The partially formed body is re-cleansed.

The open end (54, FIG. 5) of the tube is filled with a "light-emitter". Typically, mercury or indium bromide is used. Other light-emitter substances may be used in other embodiments, including iodides, bromides and/or chlorides of lithium, sodium, potassium, rubidium, cesium, strontium, scandium, cerium, praseodymium, neodymium, gadolinium, dysprosium, holmium, hafnium, thallium, lutetium, yttrium, erbium, thulium, terbium and europium. Pure metals and halogens can also be introduced into the tube to achieve desired properties.

The filled tube is attached on a high vacuum system with a standard fitting of the appropriate diameter (e.g., an UltraTorr™ fitting available commercially from SwageLok Inc.) and evacuated. The tube is then back-filled with the desired "starting gas" at the desired pressure. Typically, the starting gas is argon, although neon, krypton or xenon may be used in other embodiments. In example embodiments, the gas pressure is in a range between about 10 and 500 Torr or any range subsumed therein.

The tube is then closed with a hydrogen-oxygen torch at a point (55, FIG. 5) approximately one inch longer than the desired inner length (about 5 mm) of the bulb, to form a bulb (56, FIG. 5). The sealed bulb may be frozen in the tube using a cryogenic material such as a liquid nitrogen bath, so the stem can be heat collapsed at negative pressure up to the desired bulb edge without evaporation of the internal fill materials creating internal positive pressure.

The bulb and attached stem (58, FIG. 5) are removed from the vacuum system. If necessary, the stem can be trimmed to the correct length. Residual silica dust is removed from the lamp surfaces using hydrofluoric acid or buffing compound.

The bulb assembly may be mounted to a structure exterior to the dielectric waveguide body, such as adapter plate 36 in FIG. 1. The stem acts as a bulb support and extends through holes 25H and 31H as shown in FIG. 3 to position the bulb 56 at the desired location in the lamp chamber 32. This provides an easy way to secure and align the bulb and position it in the lamp chamber. In alternate embodiments, a bulb support may be bonded to the bottom of the lamp chamber or the waveguide body with a sintered alumina-powder layer or other adhesive material to hold the bulb in the desired position.

Figure 6:
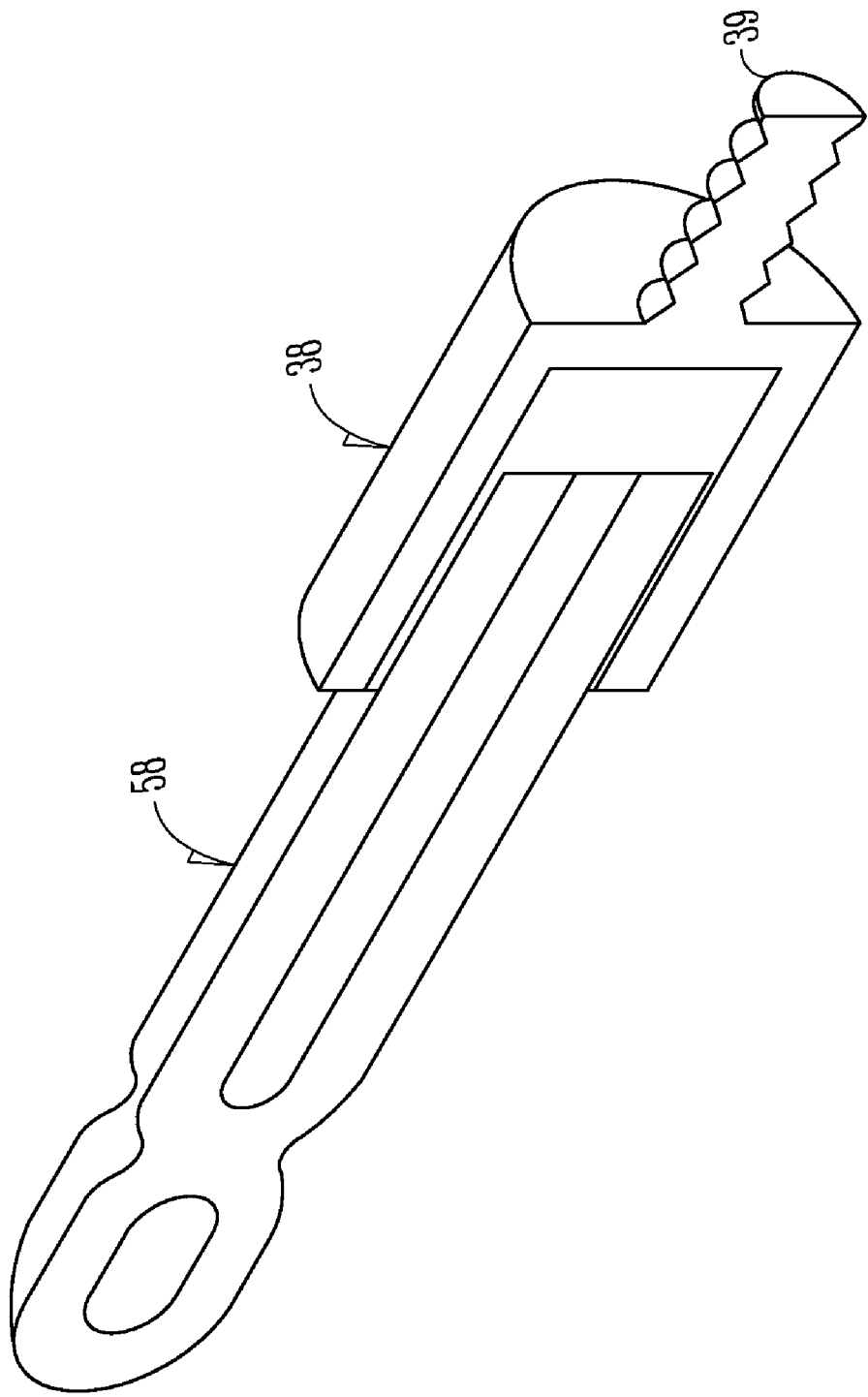
FIG. 6 is a sectional view of the FIG. 1 bulb assembly bonded to a metallic holder.

FIG. 6 shows the stem 58 mounted within holder 38 and bonded to the holder with high temperature, epoxy cement. Holder 38 includes a screw 39 for attachment to bottom adapter plate 36. The overall length of the bulb and stem is dependent on the desired position for the bulb in the lamp chamber. In example embodiments, this may depend upon the focal length of the lamp chamber's reflecting surface and details of the mounting design.

In example embodiments, the dielectric waveguide body 22 has one or more resonant modes each manifested as a certain spatial-intensity distribution of radio frequency (RF) field confined within the body. A suitably designed antenna within the lamp can intercept the RF field in the lamp chamber to create AC currents therein. The AC current in the antenna can in turn radiate into a partially enclosed space in which the bulb is closely received. The dimensions of this space must be small compared to the RF field wavelength; the net effect is a concentration of RF field in the enclosed space, i.e., space proximate to the bulb. A conductive material adjacent to the bulb may be used to form an antenna of this type and thereby concentrate the RF field near the bulb.

Figure 7:
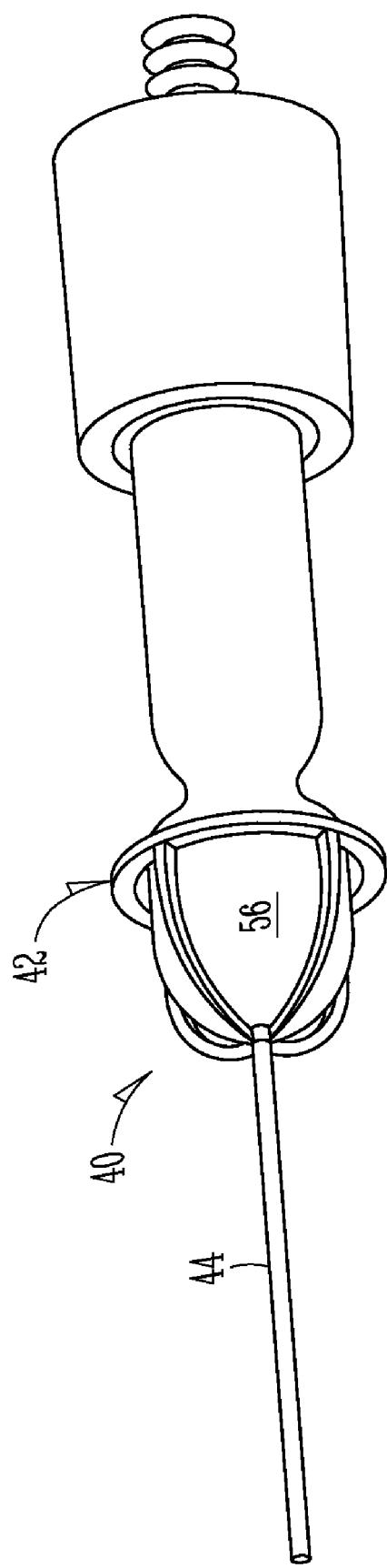
FIG. 7 is a detail perspective view of the FIG. 1 field-concentrating antenna and bulb assembly, and FIG. 6 metallic holder.

Referring to FIG. 7, field-concentrating antenna 40 is a "top" antenna having a wire cage 42 forming a tight semi-enclosed space around bulb 56 at a separation in a range from about 0.1 mm to 5.0 mm or any range subsumed therein. Cage 42 is attached to a rigid lead-wire 44 which maintains the position of cage 42 and forms a common electrical ground with coatings 23, adapter plates 34, 36, and housing 60. In example embodiments, such antennas may be fabricated from a conductor with a high melting point having an electrical conductivity greater than $10^7$ Siemens/meter. Example embodiments may use conductive materials such as nickel, platinum, molybdenum and titanium. In addition to machining, antennas can be fabricated using stamped sheet-metal or even wire. In example embodiments, the antenna thickness is selected so that it is thick enough to resist melting, and thin enough to avoid blocking an unacceptable fraction of light. Also, in example embodiments, the antenna thickness is selected to be significantly larger than the RF penetration depth ("skin depth"). In example embodiments, the thicknesses may be in the range of from about 0.1 to 2 mm or any range subsumed therein. In example embodiments, the antenna is grounded to a conductively-coated surface of the dielectric waveguide body. Various physical shapes for the antenna can be used to achieve these properties. A top antenna, bottom antenna, or both can be used. In example embodiments, the enclosure can take the form of a wire cage, fork or ring. Other shapes can also be used in other embodiments. The shapes of a top and bottom antenna can be different in some embodiments. Design of such antennas can be optimized using commercial electromagnetic modeling software such as HFSS™, available from Ansoft, Inc. of Pittsburgh, Pa., and FEMLAB™, available from COMSOL, Inc. of Burlington, Mass. In these example embodiments, the field-concentrating antenna is not physically connected to the drive or feedback probe.

Figure 8:
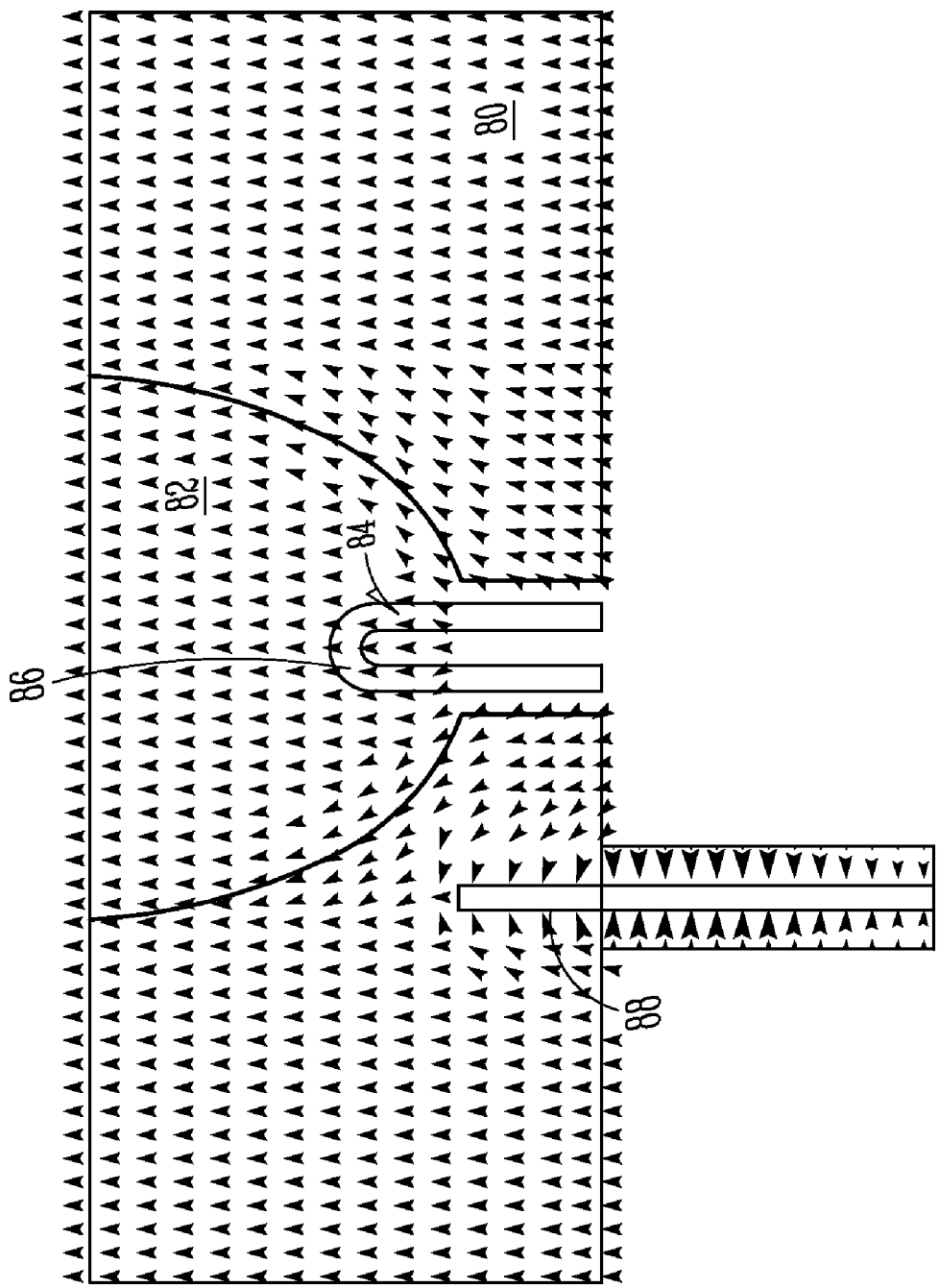
FIG. 8 graphically shows the spatial distribution and intensity of the electric field in the FIG. 1 waveguide body and lamp chamber in the absence of the field-concentrating antenna, for a resonant frequency of 878 MHz.
Figure 9:
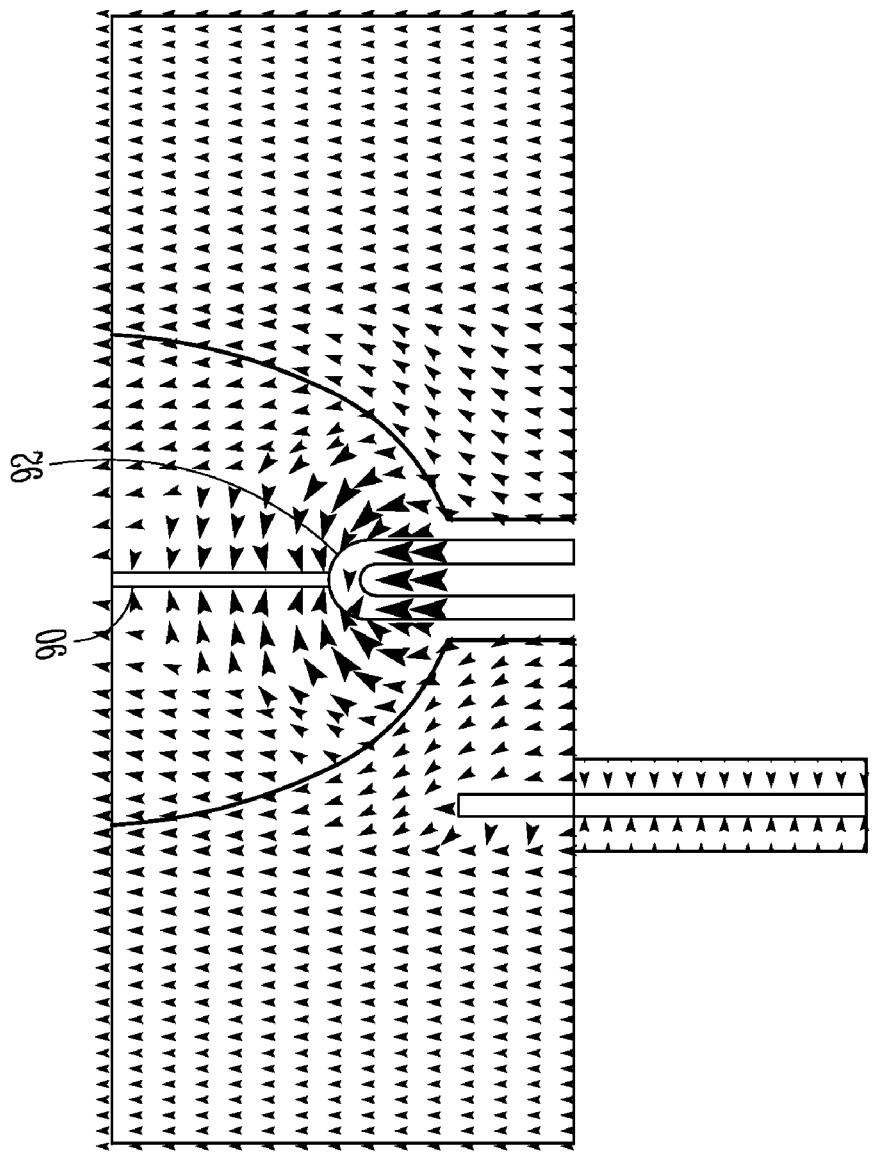
FIG. 9 graphically shows the spatial distribution and intensity of the electric field in the FIG. 1 waveguide body and lamp chamber with the field-concentrating antenna, for a resonant frequency of 878 MHz.

FIG. 8 shows a design simulation, using the HFSS™ software package, of the electric field spatial-intensity distribution in a cylindrical alumina waveguide body 80 resonating at a frequency of 878 MHz. Body 80 includes a paraboloidal lamp chamber 82 into which is inserted a bulb assembly 84 with a bulb 86, and contains an inserted drive probe 88. For simplicity, the feedback probe is not simulated because its coupling to the field (and hence its perturbation on the field) is small by design. The arrows point in the direction of the electric field; their lengths indicate relative intensity. FIG. 9 shows the electric field spatial-intensity distribution when a cage 92 of a field-concentrating antenna 90 forms a tight semi-enclosed space around bulb 86 at a separation of 1 mm. The field-concentrating effect of antenna 90 is evident. Such simulations predict that the ratio of field strength in the center of a bulb with and without an antenna is in a range from about 1.05 to 10.

Figure 10:
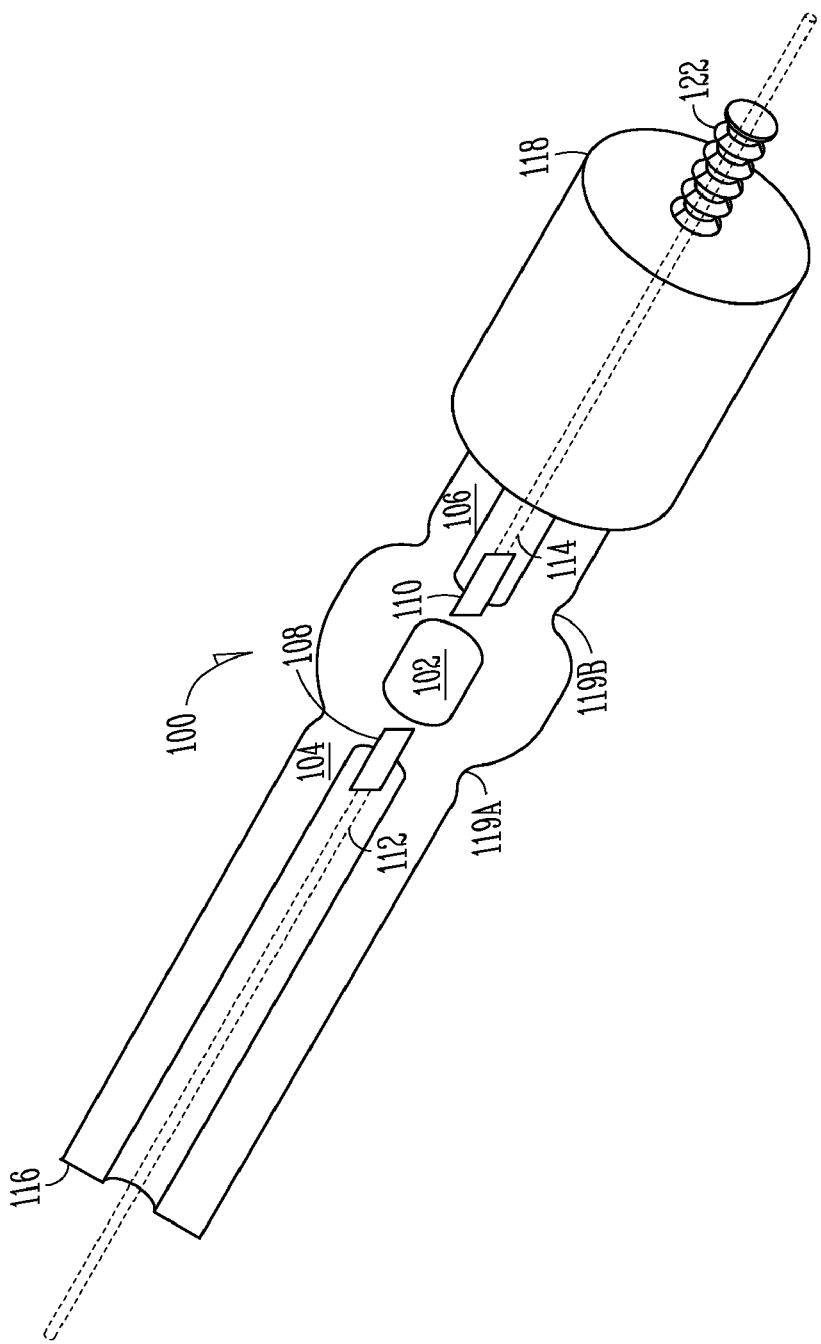
FIG. 10 is a perspective view of a bulb embodiment wherein two field-concentrating antenna elements are integrated within a quartz bulb assembly.

FIG. 10 shows an example bulb assembly 100 having a "top-and-bottom" antenna configuration. In this example embodiment, the antennas are enclosed in a dielectric material, such as quartz tubing extending from the top and bottom of the bulb. This helps avoid problems that can lead to failure of a bare antenna. A bare antenna may have failure mechanisms due to arcing to a conducting surface, and/or rapid oxidation or melting due to high RF currents flowing through the antenna(s) and/or high temperature conducted or radiated from the bulb. Bulb assembly 100, which is fabricated from quartz tubing, includes a central bulb 102 disposed between upper and lower stems 104, 106. Opposed "top" and "bottom" antenna elements 108, 110 are spot-welded, respectively, to lead-wires 112, 114 which exit the bulb through tubing openings 116, 118, respectively. Antenna elements 108, 110 are connected to a common electrical ground. At each bulb assembly end, multiple lead-wires may be used to improve both electrical and thermal conductivity. Antenna elements 108, 110 are sealed in a dielectric material, such as quartz, and lead-wires 112, 114 are fixed in position when the bulb 102 is formed by sealing the tubing at locations 119A, 119B. Lower stem 106 is closely received within and bonded to metallic holder 120 which includes a screw 122 for attachment to bottom adapter plate 36. Antenna elements may be strips of molybdenum micro-foil typically having a thickness of about 0.001 inch, and a length in a range of 2 to 10 mm, or any range subsumed therein, and a width in a range of 1 to 5 mm, or any range subsumed therein. The use of very thin foils and spot-welding prevents cracking of the quartz-enclosing seals as well as failure due to expansion mismatch of any diameter of metal wire capable of conducting the RF currents to which the antennas are exposed in the high temperature environment. The simple geometry of a bulb assembly such as assembly 100 makes it easier to fabricate than a bulb assembly such as assembly 50. The above antenna configurations and dimensions are examples only and other configurations may be used in other embodiments.

A bulb assembly such as bulb assembly 100 can be fabricated either according to the "one-piece" method described above for bulb assembly 50, or by presealing the antenna elements in separate stems which are then fused to the bulb. The following summarizes example bulb assembly fabrication processes for both one- and two-stem/antenna configurations:

A finished bulb assembly can be produced with a single stem (for attachment to a dielectric waveguide body and/or lamp chamber by cement or other means), or with a stem at each end for enclosing and positioning an antenna at either end or both ends. As described above, in example embodiments, the antenna may be a molybdenum micro-foil in close proximity to the bulb, with outer conducting wire(s) spot-welded to the micro-foil and attached to an electrical ground. If there is to be a sealed antenna at the upper end, that antenna may be hermetically sealed into the upper stem using a "shrink" seal process. This is done by presealing in a separate stem, later to be fused to a partial bulb assembly including the bulb with the open lower stem already attached, but before the fill material(s) are inserted and before a second antenna, if used, is sealed into the lower stem. Alternatively, the upper antenna can be sealed into one arm of a preformed assembly with an open stem on each end using a shrink seal process. The bulb assembly (with the upper stem heremetically sealed and attached if an upper antenna is to be used; otherwise without an upper arm, but with the bulb assembly sealed everywhere except for an open lower stem) is then filled under clean conditions through the lower stem with the required solid and/or liquid fill material(s). If an antenna sub-assembly (e.g, the antenna element and lead-wire(s)) in the stem is to be mounted in the dielectric waveguide body or lamp chamber, the antenna with the attached lead-wire(s) are then inserted into the lower stem and aligned into axial position. The bulb assembly is then placed at an appropriate station for filling the lower stem and bulb with rare gas. The fill material(s) and all parts of the antenna sub-assembly are completely enclosed in the bulb/lower stem and the bulb assembly is attached to the gas-filling apparatus by an O-ring or other suitable means. After (negative gauge pressure) gas-filling, the lower stem is "long-tipped" (i.e., collapsed by heating at a distance beyond the inserted length of the foil/lead-wire(s) sub-assembly). The hermetically sealed structure is then placed in an apparatus which immerses the bulb assembly into a cryogenic environment (e.g., liquid nitrogen) so that final sealing of the lower stem (with or without the antenna sub-assembly) can be accomplished by heat collapsing the stem at negative pressure up to the bulb edge without evaporation of the fill material(s) creating positive pressure (which would prevent collapsing of the quartz under applied heat and final closure). Each bulb assembly stem is then cut to an appropriate length, exposing the lead-wire(s) for attachment to the common electrical ground. A metal (or, if lead-wires protrude, a slotted metal or non-conducting end cap) can be attached to the lower stem if needed for precise alignment of the bulb.

What is claimed is:

1. An electrodeless plasma lamp comprising:
   a metal enclosure having conductive boundary forming a resonant cavity;
   a radio frequency (RF) feed to couple power from an RF power source into the resonant cavity;
   a bulb adjacent to an upper surface of the metal enclosure, the bulb containing a fill that forms a plasma when power is coupled to the fill, the bulb supported at least partially within the metal enclosure; and
   a conductive component having a lower end and an upper end, the lower end being electrically coupled to the metal enclosure, and the upper end being proximate the bulb, wherein the conductive component modifies at least a portion of an electric field of the resonant cavity proximate the bulb so that the portion of the electric field is oriented substantially parallel to the upper surface of the metal enclosure.

2. The electrodeless plasma lamp of claim 1, comprising a first conductive component and a second conductive component, the first conductive component being proximate a first end of the bulb and the second conductive component being proximate a second end of the bulb.

3. The electrodeless plasma lamp of claim 2, wherein the upper end of each of the first and second conductive components is part of an antenna element to concentrate the electrical field proximate the bulb.

4. The electrodeless plasma lamp of claim 1, wherein the upper end of the conductive component is part of an antenna element to concentrate the electrical field proximate the bulb.

5. The electrodeless plasma lamp of claim 4, wherein the antenna element is elongate and extends substantially parallel with a longitudinal axis of the bulb.

6. The electrodeless plasma lamp of claim 5, wherein the antenna element has a length of between 2-10 mm and a width of between 1-5 mm.

7. The electrodeless plasma lamp of claim 4, wherein the antenna element is a metal coating.

8. The electrodeless plasma lamp of claim 4, wherein the bulb is comprises quartz and the antenna element is in contact with the quartz.

9. The electrodeless plasma lamp of claim 4, wherein the antenna element intercepts RF fields and creates an alternating current (AC) that radiates into the bulb.

10. The electrodeless plasma lamp of claim 1, wherein the bulb is an elongate bulb, the plasma lamp comprising a support having a longitudinal axis aligned with the longitudinal axis of the bulb.

11. The electrodeless plasma lamp of claim 1, wherein the lower end of the conductive component is electrically grounded to the metal enclosure.

12. The electrodeless plasma lamp of claim 1, wherein the conductive boundary is an electrically conductive coating on a lamp body.

13. The electrodeless plasma lamp of claim 1, wherein the conductive component is spaced apart from the bulb and the RF feed.

14. The electrodeless plasma lamp of claim 1, wherein a distance from an end of the bulb to the conductive component is less than 5 mm.

15. The electrodeless plasma lamp of claim 1, wherein a resonant mode for the resonant cavity is a fundamental resonant mode.

16. The electrodeless plasma lamp of claim 1, wherein the elongate RF feed is a drive probe.

17. The electrodeless plasma lamp of claim 16, wherein the drive probe is cylindrical with a diameter greater than 1.5 mm.

18. The electrodeless plasma lamp of claim 16, wherein the drive probe has a length greater than 10 mm.

19. The electrodeless plasma lamp of claim 1, wherein RF power is provided to the lamp body at a frequency less than 1 GHz.

20. The electrodeless plasma lamp of claim 1, wherein the conductive component is cylindrical in cross-section.

21. The electrodeless plasma lamp of claim 1, wherein the conductive component extends along at least an end portion of the bulb.

* * * * *